United States Patent Office 2,959,571
Patented Nov. 8, 1960

2,959,571

PROCESS FOR THE PREPARATION OF SELF-EXTINGUISHING EPOXIDE RESINS

Gerhard Faerber, Moers, Germany, assignor to Deutsche Solvay-Werke G.m.b.H., Solingen-Ohligs, Germany No Drawing. Filed June 1, 1956, Ser. No. 588,607

Claims priority, application Germany June 14, 1955

10 Claims. (Cl. 260—77.5)

It is known to prepare condensation products from epichlorhydrin and/or dichlorhydrin with one or more polyvalent alcohols and/or phenols such as diphenylol propane, and to convert these thermoplastic products, which as such have only limited use, by using so-called hardeners, into cross-linked, insoluble and unmeltable products. Bases such as alkali or alkaline earth hydroxides; N-containing compounds such as diethylamine, pyridine, piperidine, triethanolamine, cyanamide, polyamines; compounds such as phenolformaldehyde resins containing methylol groups; anhydrides such as phthalic acid or maleic acid anhydride; also acids, such as phosphoric acid and oxalic acid, metal salts of organic compounds, ion exchangers and the like are mainly used as hardeners. The product obtained by the hardening have the disadvantage of being very combustible and this sets a limit to their use.

It is also known to add extenders of inorganic nature such as ground shale, talcum, kaolin, titanium white, metal oxides, silicon carbide, glass fibres, ground porcelain, quartz powder and quartz sand to the condensation products obtained from epichlorhydrin and/or dichlorhydrin and one or more poly alcohols and/or phenols. The combustibility of the condensation products is only slightly reduced by the extenders, and self-extinguishing resins cannot thereby be obtained.

It has also already been proposed to add incombustible plasticisers such as tricresyl-phosphate to the aforementioned condensation products. Since, however, the plasticisers can be worked only in very small amounts into the condensation products to be hardened, the combustibility of the hardened product is only slightly reduced.

It has surprisingly been found that incombustible epoxide resins can be obtained by dissolving the condensation products obtained from epichlorhydrin and/or dichlorhydrin on the one hand, and one or more polyvalent alcohols and/or phenols, such as diphenylol propane, on the other, with pentachlorophenol by heating, and then hardening in known manner the condensation products modified by pentachlorophenol. Instead of pentachlorophenol the condensation product obtained from equimolecular quantities of pentachlorophenol and epichlorhydrin may be used with equal success.

The resins obtained in accordance with the invention are extinguished with chlorine contents of about 30% and above immediately after removal from the hot flame of the Bunsen burner. It is preferable not to add greater quantities than 65% of pentachlorophenol to the condensation product because with greater contents the pentachlorophenol is exuded. It is preferable to work with such quantities of pentachlorophenol that the hardened resin has a chlorine content of about 25-42%.

A part of the pentachlorophenol or respectively of the condensation products obtained from equimolecular quantities of pentachlorophenol and epichlorhydrin may be already added to the reaction mixture to be condensed. In this manner, however, it is not possible to obtain condensation products having a content of 30% chlorine, so that further quantities of pentachlorophenol or respectively of a condensation product of pentachlorophenol and epichlorhydrin must still be added to the condensation product to be hardened.

The hardening of the condensation products dissolved in pentachlorophenol or in the condensation product of pentachlorophenol and epichlorhydrin is effected in known manner and with known means. It is preferable to use those hardeners which are already effective in small quantities, such as organic compounds containing nitrogen. However, other hardeners may also be used with good results, such as anhydrides of poly-basic acids. m-Phenylene diamine has also proved to be suitable. With the use of m-phenylene diamine as hardener, the resins obtained have an excellent surface lustre. In the case of hardeners containing nitrogen, the quantity of hardener amounts to about 10% of the quantity of thermoplastic condensation product in the mixture with pentachlorophenol, but 30–50% in the case of anhydrides.

The resins obtained in accordance with the invention retain their form up to beyond 100° C. They have a hard, smooth surface which cannot be scratched by finger nails. At higher temperatures they gradually soften and exhibit rubber-like properties. The resins are unmeltable and deform in the hot flame of the Bunsen burner until they become crumbling incombustible skeletons. Owing to their content of pentachlorophenol, which becomes at least partly chemically bound during the setting, the resins have excellent fungicide and bactericide properties. The resins are used as fire-proofing coating compositions, lacquers, varnishes and adhesives and may be used for the manufacture of moulded objects, films and fibers. Their main use is in all cases where there is any considerable risk of fire.

As stated above, a part of the pentachlorophenol can be added already to the reaction mixture to be condensed. Pentachlorophenol is chemically bound hereby by epoxide groups so that its quantity must be limited, since free epoxide groups must still be present for the subsequent setting. Resins having a content of 30% chlorine cannot be manufactured in this manner.

Epoxide resins in which pentachlorophenol is condensed in this manner and in such quantities that the condensation products contain more than 25% chlorine, offer various advantages, however. Owing to the chemical binding of the pentachlorophenol, losses can scarcely occur from washing out, sublimation, diffusion or exuding.

It was found that such quantities of pentachlorophenol can also be added to the reaction mixture to be condensed, consisting of epichlorhydrin and/or dichlorhydrin and one or more alcohols and/or phenols, that the condensation product to be hardened has a chlorine content of more than 25 up to 50%. These condensation products may be hardened if di- or polyisocyanates are used for this purpose. They react with the numerous secondary oxide groups of the resin, which are produced when an epoxide group reacts with pentachlorophenol.

Composition of a few epoxide resins modified with pentachlorophenol and their combustibility:

Condensation product manufactured from:
2 mols epichlorhydrin,
1 mol diphenylol propane,
2 mols NaOH, with or without pentachlorphenol
Hardener: m-phenylene diamine.

| Condensation Product, g. | Pentachlorphenol, g. | Hardener | Percent Cl (analysis) | Combustibility |
|---|---|---|---|---|
| 10 | | 1 | | Continues to burn violently. |
| 10 | (¹) | 1 | | Continues to burn. |
| 10 | 2 | 1 | 10.2 | Do. |
| 10 | 6 | 1 | 23.5 | Continues partly to burn. |
| 10 | 8 | 1 | 27.8 | Soon extinguishes. |
| 10 | 9 | 1 | 32.9 | Immediately extinguishes. |
| 10 | 16 | 1 | 39.5 | Do. |
| 10 (8.7% Cl) | 4 | 1 | 20.54 | Continues partly to burn. |

¹ 9 g. talcum.

The combustibility was ascertained by holding resin fragments of the same size and shape for 30 seconds in the hot flame of a Bunsen burner standing in a draught-free place, and then removing these fragments.

EXAMPLES

*Preparation of the thermoplastic condensation products*

A. *Without pentachlorophenol.*—57 g. of diphenylol propane are dissolved in a beaker in a solutoin of 20 g. NaOH and 233 g. of water at 40–60° C. After completely dissolving, the mixture is filtered and 46 g. of epichlorhydrin added at the same temperature and the mixture stirred; at the same time the temperature rises to 80° C. The resin is precipitated within about a quarter of an hour. It is washed 3 to 4 times with 300–400 g. of water each time until the chlorine content has dropped to about 1%. The resin is then dried by heating to 120–130°. The epoxide number amounts to 347.6. The softening point is at 33° C.

This product is termed condensate A in the following examples.

B. *With pentachlorophenol.*—A solution of 20 g. NaOH and 250 g. of water is heated in a beaker to 40–60° C. and then 11 g. pentachlorophenol and 46 g. diphenylol propane are added in succession. After a clear solution has been obtained, the mixture is filtered and 46 g. epichlorhydrin added at a temperature of 60–80° C. and the mixture stirred. The resin precipitates within half an hour. It is washed three of four times with 300–400 g. of water and dried by heating to 120–130° C. The epoxide number amounts to 478. The softening point is 46° C. The resin contains 8.74% chlorine. This product is termed condensate B in the following examples.

*Preparation of self-extinguishing resins*

(1) 10 g. of freshly prepared condensate A and 8 g. of pentachlorophenol are heated in a 10 ccm. beaker until the two products have dissolved, which takes place at about 100° C. 1 g. m-phenylene diamine is added to this solution and thoroughly stirred. The solution is then poured on to a prepared mould—preferably a watch glass having a polyvinyl alcohol film—and hardened at 180° C. for 2 hours in the drying cupboard. The resin obtained is black and has a lacquer-like lustre and hard surface. It is unmeltable and not brittle. At about 100° C. the surface begins to soften slowly. The chlorine content amounts to 27.8%. It is no longer possible to ignite the resin.

(2) If, in Example 1, 9 g. of pentachlorophenyl are used instead of 8 g., the hardened resin contains 32.9% chlorine and immediately extinguishes upon removal from the hot flame of the Bunsen burner.

(3) If, in Example 1, 12 g. pentachlorophenol are used instead of 8 g. and 1.5 g. m-phenylene diamine instead of 1 g. the hardened resin then contains 34% chlorine. It softens at a temperature of just over 100° C. The resin immediately extinguishes upon removal from the hot flame of the Bunsen burner.

(4) If, in Example 1, 16 g. of pentachlorophenol are used instead of 9 g., the hardened end product contains 39.5% chlorine. This resin is more brittle than the products obtained in Examples 1 to 3. The remaining properties correspond to those of the other resins. After removal from the hot flame of the Bunsen burner, the resin immediately extinguishes.

(5) 10 g. of freshly prepared condensate A and 9 g. of pentachlorophenol are heated in a beaker to 100–120° C. until dissolved and then 5 g. phthalic acid anhydride added and the mixture thoroughly stirred. The solution is poured on to a watch glass and hardened at 180° C. for 4 hours. The hardened resin is light brown and clear. It is firmly cemented to the mould and even after being broken up into very small pieces, cannot be removed from the glass. The resin has a chlorine content of 25% and extinguishes soon after removal from the hot flame of the Bunsen burner.

(6) 50 g. of freshly prepared condensate A and 45 g. pentachlorophenol are dissolved in a beaker as in Example 1 and 6 g. m-phenyldiamine added as hardener. The solution is poured into an iron mould which is coated with a polyvinyl alcohol film and hardened at 180° C. for 2 hours. After cooling, the block of resin may be easily removed from the mould. The properties correspond to the resin obtained in Example 2.

(7) 10 g. of freshly prepared condensate B are dissolved as in Example 1 with 6 g. pentachlorophenol and 1 g. m-phenylene diamine added. The solution is poured on to a watch glass which has previously been coated with cellulose acetate as separating means and hardened at 180° for 2 hours. The resin obtained is black with a lacquer-like lustrous surface. It has a chlorine content of 28.5% and extinguishes soon after removal from the hot flame of the Bunsen burner.

(8) 87.5 g. diphenylol propane and 138 g. pentachlorophenol are dissolved together with 61.5 g. NaOH in 655 g. water and the solution is filtered hot. 118 g. epichlorhydrin are added at 65° with stirring. The inner temperature of the retort increases within 15 minutes to 86° C. Heating is then effected to 100° C. within 65 minutes and this temperature is maintained for 1 hour. The precipitated resin is washed until alkaline reaction disappears, and dried by careful heating to 150° C. The resin formed has a softening point between 25 and 30° C. The epoxide equivalent amounts to 1617 and the chlorine content 32.38%. 10 g. of this resin are dissolved together with 3.15 g. of hexamethylene diisocyanate and poured into a mould. The mixture is kept at 180° C. for 18 hours. The hardened resin is unmeltable and insoluble in organic solvents and has a "Wärmeformbeständigkeit" according to Vicat of 71°.

(9) 38 g. diphenylol propane and 266 g. pentachlorophenol are dissolved together with 92 g. NaOH in 1128 g. water and the solution filtered hot. Then at 65° C. 92.5 g. epichlorhydrin are added and within 80 minutes the temperature allowed to rise slowly to 100°. Heating at 100° is continued for another hour. The precipitated resin is washed and worked up as in Example 1. A clear, brown, hard and non-adhesive resin is produced having a softening point of 72° C. and an epoxide equivalent of 3608. The chlorine content amounts to 47%. 10 g. are dissolved together with 1.5 g. hexamethylene diisocyanate and hardened by heating for 10 hours at 170–180°. The properties of the hardened resin correspond substantially to those of the resin hardened according to Example 1. It has self-extinguishing properties and immediately extinguishes after removal from the hot flame of the Bunsen burner.

I claim:

1. Process for making self-extinguishing epoxide resins comprising combining at a temperature of from about 100° to about 120° C. a thermoplastic resin epoxy condensate of diphenylolpropane and a compound selected from the group consisting of epichlorhydrin and dichlorhydrin with a chlorine containing modifying agent selected from the group consisting of pentachlorophenol and a condensation product of equimolecular quantities of pentachlorophenol and epichlorhydrin, said modifying agent and said thermoplastic resin epoxy condensate being in such proportions, that from 8 to 16 parts of weight pentachlorophenol are combined with 10 parts of thermoplastic resin epoxy condensate, and converting the modified thermoplastic condensate to a thermoset, insoluble condition with 10–50% of a cross-linking agent selected from the group consisting of m-phenylene diamine, phthalic anhydride and hexamethylene diisocyanate based on the weight of the thermoplastic resin epoxy condensate before being modified.

2. Process of making self-extinguishing epoxide resins comprising reacting at a temperature of from about 60° to about 100° C. pentachlorophenol, diphenylolpropane and epichlorhydrin in the proportion of about 2.5 mols epichlorhydrin and 0.2 mol pentachlorophenol per mol of diphenylolpropane to form a thermoplastic epoxy condensate, and heating said condensate with, based on the weight of the condensate, about 60% pentachlorophenol and from 10 to about 50% of a cross linking agent selected from the group consisting of m-phenylene diamine, phthalic acid anhydride and hexamethylene diisocyanate to form a thermoset resin.

3. Process of making self-existinguishing epoxide resins comprising reacting at a temperature of from about 60° to about 100° C. pentachlorophenol, diphenylolpropane and epichlorhydrin in the proportion of from about 160 to about 700 parts pentachlorophenol and from about 135 to about 240 parts epichlorhydrin per 100 parts diphenylolpropane, all by weight, to form a thermoplastic epoxy condensate, and heating said condensate with from about 15 to about 31.5% based on said condensate of hexamethylene diisocyanate at a temperature of about 180° C. to form a thermoset resin.

4. A self-extinguishing epoxide resin made by the method of claim 1.

5. Process of making self-extinguishing epoxide resins comprising reacting at a temperature of from about 100° to about 120° C. by weight 10 parts of a thermoplastic resin epoxy condensate of diphenylol propane and a compound selected from the group consisting of epichlorohydrin and dichlorohydrin, with 8 to 16 parts of pentachlorophenol; and insolubilizing the reaction product with 1 to 5 parts of a cross linking agent selected from the group consisting of m-phenylene diamine, phthalic anhydride and hexamethylene diisocyanate.

6. A process as in claim 1 wherein the pentachlorophenol content of the modifying agent is in an amount to provide a chlorine content of about 25–42% in the thermoset material.

7. A process as in claim 1 wherein a portion of the pentachlorophenol is a constituent of said epoxy condensate.

8. Process according to claim 1, characterised by the feature that cross-linking is effected with 30 to 50% of phthalic anhydride based on said epoxy condensate.

9. Process according to claim 1, characterised by the feature that cross-linking is effected with 10 to 15% of m-phenylene diamine based on said epoxy condensate.

10. Process according to claim 1, characterised in that pentachlorophenol is added in such quantities to the reaction mixture to be condensed that the condensation product has a content of chlorine of more than 25 up to about 50% and hardening is effected by means of 15 to 31.5% of hexamethylene diisocyanate based on said epoxy condensate.

References Cited in the file of this patent

UNITED STATES PATENTS

| 2,582,985 | Greenlee | Jan. 22, 1952 |
| 2,703,765 | Osdal | Mar. 8, 1955 |
| 2,840,540 | Rosenberg et al. | June 24, 1958 |

OTHER REFERENCES

Little: "Flameproofing Textile Fabrics," p. 363, Reinhold (1947).